(12) United States Patent
Cho et al.

(10) Patent No.: US 12,189,737 B2
(45) Date of Patent: Jan. 7, 2025

(54) BIOMETRIC INFORMATION REGISTRATION METHOD AND BIOMETRIC INFORMATION REGISTRATION DEVICE FOR PERFORMING SAME

(71) Applicant: ALCHERA INC., Seongnam-si (KR)

(72) Inventors: Dongmin Cho, Seoul (KR); Hyukjoon Kwon, Seoul (KR); Kang Eui Lee, Seoul (KR)

(73) Assignee: ALCHERA INC., Seongnam-si (KR)

( * ) Notice: Subject to any disclaimer, the term of this patent is extended or adjusted under 35 U.S.C. 154(b) by 311 days.

(21) Appl. No.: 17/417,652

(22) PCT Filed: Nov. 18, 2020

(86) PCT No.: PCT/KR2020/016263
§ 371 (c)(1),
(2) Date: Sep. 27, 2022

(87) PCT Pub. No.: WO2021/153888
PCT Pub. Date: Aug. 5, 2021

(65) Prior Publication Data
US 2023/0027328 A1    Jan. 26, 2023

(30) Foreign Application Priority Data

Jan. 31, 2020    (KR) .................. 10-2020-0012098

(51) Int. Cl.
*G06F 21/00* (2013.01)
*G06F 21/32* (2013.01)
*G06F 21/45* (2013.01)

(52) U.S. Cl.
CPC .............. *G06F 21/32* (2013.01); *G06F 21/45* (2013.01); *G06F 2221/2117* (2013.01)

(58) Field of Classification Search
CPC .. G06F 21/32; G06F 21/45; G06F 2221/2117; G06F 21/6272
See application file for complete search history.

(56) References Cited

U.S. PATENT DOCUMENTS 11,138,333 B2 * 10/2021 Streit .................. G06V 10/454
11,854,289 B2 * 12/2023 Derakhshani ...... G06V 40/1382
(Continued)

FOREIGN PATENT DOCUMENTS

JP    2019-101927 A    6/2019
JP    2019-519874 A    7/2019
(Continued)

*Primary Examiner* — William A Corum, Jr.
(74) *Attorney, Agent, or Firm* — Sughrue Mion, PLLC

(57) ABSTRACT

The embodiments disclosed herein relate to a biometric information registration apparatus and method using an artificial neural network. According to an embodiment, there are disclosed a biometric information registration apparatus and method that register biometric information by deriving converted information and a biometric information template based on an artificial neural network formed by successively connecting an encoding network for extracting security information and a feature point extraction network for extracting feature points to each other and renew the biometric information template using the converted information when updating the artificial neural network.

5 Claims, 5 Drawing Sheets

(56) References Cited

U.S. PATENT DOCUMENTS

| | | | |
|---|---|---|---|
| 2011/0285504 A1* | 11/2011 | Puerto | G10L 17/18 |
| | | | 340/5.84 |
| 2019/0280868 A1 | 9/2019 | Streit | |
| 2019/0347390 A1* | 11/2019 | Kim | G06N 7/01 |
| 2019/0354787 A1* | 11/2019 | Fong | G06V 10/454 |
| 2020/0014541 A1 | 1/2020 | Streit | |
| 2020/0143137 A1* | 5/2020 | Gottemukkula | G06N 3/04 |
| 2020/0329033 A1 | 10/2020 | Bron | |
| 2021/0326571 A1* | 10/2021 | Nakvosas | G06N 3/04 |
| 2022/0405363 A1* | 12/2022 | Williams | G10L 17/02 |

FOREIGN PATENT DOCUMENTS

| | | |
|---|---|---|
| KR | 10-2016-0072705 A | 6/2016 |
| KR | 10-2017-0098105 A | 8/2017 |
| KR | 10-2019-0128536 A | 11/2019 |
| KR | 10-2020-0006757 A | 1/2020 |

\* cited by examiner

BIOMETRIC INFORMATION REGISTRATION METHOD AND BIOMETRIC INFORMATION REGISTRATION DEVICE FOR PERFORMING SAME

TECHNICAL FIELD

The embodiments disclosed herein relate to a biometric information registration method using an artificial neural network and a biometric information registration apparatus for performing the same, and more particularly to a biometric information registration method using an artificial neural network designed to enable continuous update without biometric information received as an initial input value and a biometric information registration apparatus for performing the same.

BACKGROUND ART

Recently, in order to improve security and also increase convenience, security technology using biometric information has become popularized. Security technology using biometric information has already been applied and used in various fields ranging from entry to security areas and the security of personal mobile phones to banking transactions.

In particular, as artificial intelligence technology represented by deep learning networks has developed, security technology using biometric information and artificial intelligence technology are combined with each other, thereby further improving security and accuracy.

For example, according to the 'User Authentication Apparatus and Method' of Korean Patent Application Publication No. 10-2016-0118508, there is disclosed a technology that performs user authentication using iris information, in which case an artificial neural network is used in an authentication process.

However, with conventional technologies, it is difficult to maintain and supplement the artificial neural network designed to register biometric information, so that it is difficult to immediately apply rapidly developing deep learning technology.

Accordingly, the embodiments disclosed herein are intended to disclose a technology that can overcome the above-described problem and facilitate the maintenance and supplementation of an artificial neural network for the registration of biometric information.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

DISCLOSURE

Technical Problem

The embodiments disclosed herein are intended to propose a biometric information registration apparatus and method using an artificial neural network designed to enable continuous update without biometric information received as an initial input value.

Technical Solution

In order to overcome the above-described technical problem, there are provided a biometric information registration apparatus and method that register biometric information by deriving converted information and a biometric information template based on an artificial neural network constructed by successively connecting an encoding network for extracting security information and a feature point extraction network for extracting feature points to each other and renew the biometric information template using the converted information when updating the artificial neural network.

Advantageous Effects

According to the embodiments disclosed herein, there may be proposed the biometric information registration apparatus and method using an artificial neural network designed to enable continuous update without biometric information received as an initial input value.

The effects that can be obtained by the embodiments disclosed herein are not limited to the above-described effects, and other effects that have not been described above will be clearly understood by those having ordinary skill in the art, to which the present invention pertains, from the following description.

BEST MODE

Figure 1:
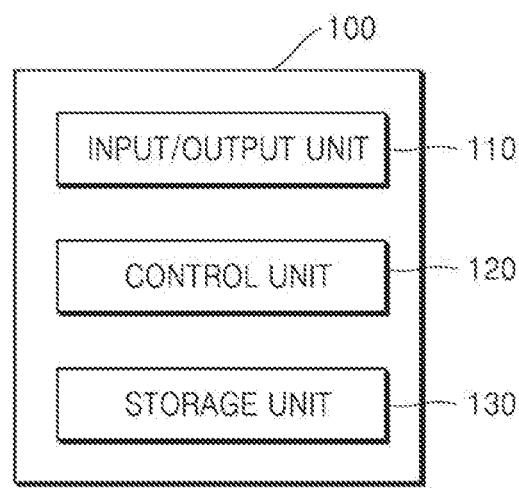
FIG. 1 is a block diagram showing the configuration of a biometric information registration apparatus according to an embodiment.

As a technical solution for accomplishing the above objects, according to an embodiment, there is disclosed a biometric intonation registration apparatus for generating a biometric information template corresponding to biometric information based on an artificial neural network, the biometric intonation registration apparatus including: an input/output unit configured to receive biometric information and output the result of registration of the biometric information; a storage unit configured to store a program for registering the biometric information; and a control unit including at least one processor; wherein the control unit, when receiving a request for the registration of the biometric information, forms an artificial neural network in which an encoding network and a feature point extraction network are successively connected to each other by executing the program, applies the biometric information to the artificial neural network as an input, stores the output of the encoding network as converted information, and stores the output of the feature point extraction network as a biometric information template; and wherein the converted information is used to renew the biometric information template when the artificial neural network is updated.

According to another embodiment, there is disclosed a biometric information registration method that is performed by a biometric information registration apparatus for generating a biometric information template corresponding to biometric information based on an artificial neural network, the biometric information registration method including: receiving biometric information; forming an artificial neural network in which an encoding network and a feature point extraction network are successively connected to each other;

applying the biometric information to the artificial neural network as an input, and storing the output of the encoding network as converted information; and storing the output of the feature point extraction network as a biometric information template; wherein the converted information is used to renew the biometric information template when the artificial neural network is updated.

According to still another embodiment, there is disclosed a computer-readable storage medium having stored thereon a program for performing a biometric information registration method that is performed by a biometric information registration apparatus for generating a biometric information template corresponding to biometric information based on an artificial neural network, the biometric information registration method including: receiving biometric information; forming an artificial neural network in which an encoding network and a feature point extraction network are successively connected to each other; applying the biometric information to the artificial neural network as an input, and storing the output of the encoding network as converted information; and storing the output of the feature point extraction network as a biometric information template; wherein the converted information is used to renew the biometric information template when the artificial neural network is updated.

According to still another embodiment, there is disclosed a computer program stored in a medium in order to perform a biometric information registration method that is performed by a biometric information registration apparatus for generating a biometric information template corresponding to biometric information based on an artificial neural network, the biometric information registration method including: receiving biometric information; forming an artificial neural network in which an encoding network and a feature point extraction network are successively connected to each other; applying the biometric information to the artificial neural network as an input, and storing the output of the encoding network as converted information; and storing the output of the feature point extraction network as a biometric information template; wherein the converted information is used to renew the biometric information template when the artificial neural network is updated.

MODE FOR INVENTION

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is 'directly connected' to the other component but also a case where the one component is 'connected to the other component with a third component arranged therebetween.' Furthermore, when one portion is described as "including" one component, this does not mean that the portion does not exclude another component but means that the portion may further include another component, unless explicitly described to the contrary.

The embodiments will be described in detail below with reference to the accompanying drawings.

In the following embodiments, there are disclosed a biometric information registration apparatus 100 and biometric information registration method using an artificial neural network 20 designed to enable continuous update without biometric information 10 received as an initial input value.

According to an embodiment, the biometric information registration apparatus 100 performs an operation through the artificial neural network 20 by using the biometric information 10, requested to be registered, as an input value, and thus feature points are extracted, so that a biometric information template 40 is generated and stored, thereby registering the biometric information 10.

First, FIG. 1 is a block diagram showing the configuration of the biometric information registration apparatus 100 for registering the biometric information 10 using the artificial neural network 20 according to an embodiment.

Referring to FIG. 1, the biometric information registration apparatus 100 according to the embodiment may include an input/output unit 110, a control unit 120, and a storage unit 130.

The input/output unit 110 may include an input unit configured to receive the biometric information 10 of a person for whom registration is requested, and an output unit configured to output the result of registration of the biometric information 10.

According to an embodiment, the biometric information 10 may include a fingerprint image, an iris image, a facial image, and the like. According to an embodiment, the biometric information may include a voice print. In order to receive the biometric information 10 described above, the input unit may include a fingerprint reader, a high-performance camera, a microphone, and the like, and may remotely receive the biometric information 10 obtained through another device.

In addition, the control unit 120 is a component including at least one processor such as a CPU, a GPU, or the like, forms the artificial neural network 20, and performs an operation based on the formed artificial neural network 20. The control unit 120 may perform such an operation by executing a program stored in the storage unit 130 to be described later.

The storage unit 130 is a component capable of storing a file and a program, and may be implemented to include various types of memory. In particular, a program capable of performing a biometric information registration method using the artificial neural network 20 may be stored in the storage unit 130. The control unit 120 may process operations related to the biometric information 10 and register the biometric information 10 by executing the program.

A process in which the control unit 120 registers the biometric information 10 using the artificial neural network 20 will be described below with reference to FIG. 2.

According to an embodiment, the control unit 120 may receive the biometric information 10 of a person, for whom registration is requested, through the input unit.

In addition, the control unit 120 may form the artificial neural network 20 by executing a program stored in the storage unit 130. In this case, the artificial neural network 20 is designed to generate a biometric information template 40 by extracting feature points from the biometric information 10 in order to register the biometric information 10. Referring to FIG. 2, the artificial neural network 20 may be constructed by successively connecting an encoding network 21 and a feature point extraction network 22 to each other.

In this case, the encoding network 21 is a component configured to output converted information 30 capable of replacing the biometric information 10 as raw data by encoding the biometric information 10, and the feature point extraction network 22 is a component connected to the encoding network 21 and configured to output the biometric information template 40 corresponding to the biometric information 10 by performing an operation. In this case, the converted information 30 may be implemented as a multi-dimensional vector value according to the last layer of the encoding network 21, and the control unit 120 may continue the operation of the artificial neural network 20 by applying the converted information 30 to the feature point extraction network 22 as an input.

In other words, the control unit 120 performs an operation by applying the biometric information 10 to the artificial neural network 20 as an input. In this case, the control unit 120 may store the output of the encoding network 21 disposed at the front end of the artificial neural network 20 in the storage unit 130 as the converted information 30 for the biometric information 10, and may also store the output of the feature point extraction network 22 connected to the encoding network 21 and disposed at the rear end of the artificial neural network 20 in the storage unit 130 as the biometric information template 40. In this case, the biometric information template 40 may be encrypted and stored according to an encryption algorithm.

According to an embodiment, the converted information 30 may be used to renew the biometric information template 40 when the artificial neural network 20 is updated.

In this regard, according to an embodiment, the control unit 120 may update the artificial neural network 20, in which case the control unit 120 may update the feature point extraction network 22. For example, the update may be performed on the feature point extraction network 22 excluding the encoding network 21 in the artificial neural network 20.

In this case, the control unit 120 may update the biometric information template 40 by applying the stored converted information 30 to the updated feature point extraction network 22 as an input. In other words, the control unit 120 may update the biometric information template 40 without the biometric information 10 by applying the converted information 30, instead of the biometric information 10, to the updated feature point extraction network 22 as an input.

Therefore, the control unit 120 may faithfully protect personal information by destroying the biometric information 10 without storing it, and may improve convenience and immediately supplement the artificial neural network by omitting the process of re-receiving the biometric information 10 for update.

Figure 3:
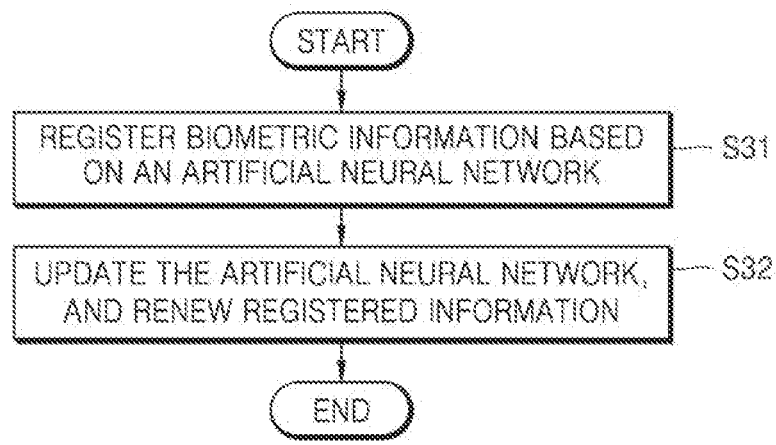
FIGS. 3 to 5 are flowcharts illustrating a biometric information registration method according to an embodiment.
Figure 4:
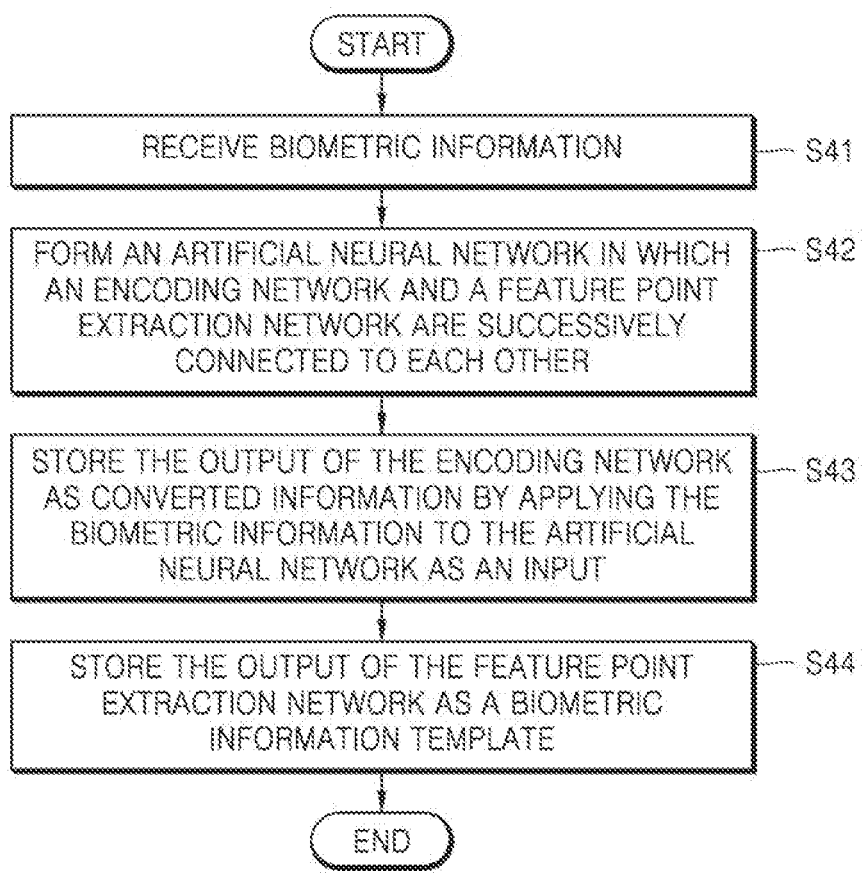
Figure 5:
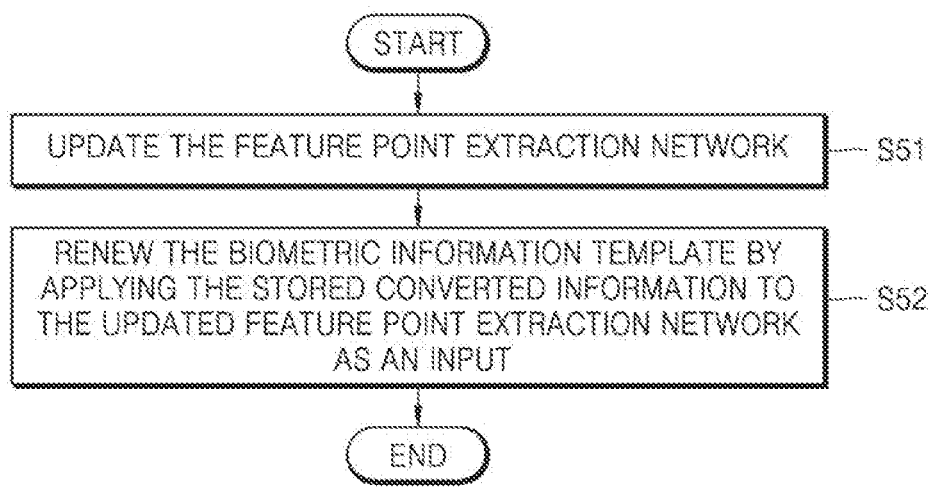

A biometric information registration method that is performed by the biometric information registration apparatus 100 that generates the biometric information template 40 based on the artificial neural network 20 as described above will be described below. FIGS. 3 to 5 are flowcharts illustrating a method of registering the biometric information 10 by extracting feature points from the biometric information 10 based on the artificial neural network 20 formed by successively connecting the encoding network 21 and the feature point extraction network 22 and generating the biometric information template 40 according to an embodiment.

Figure 2:
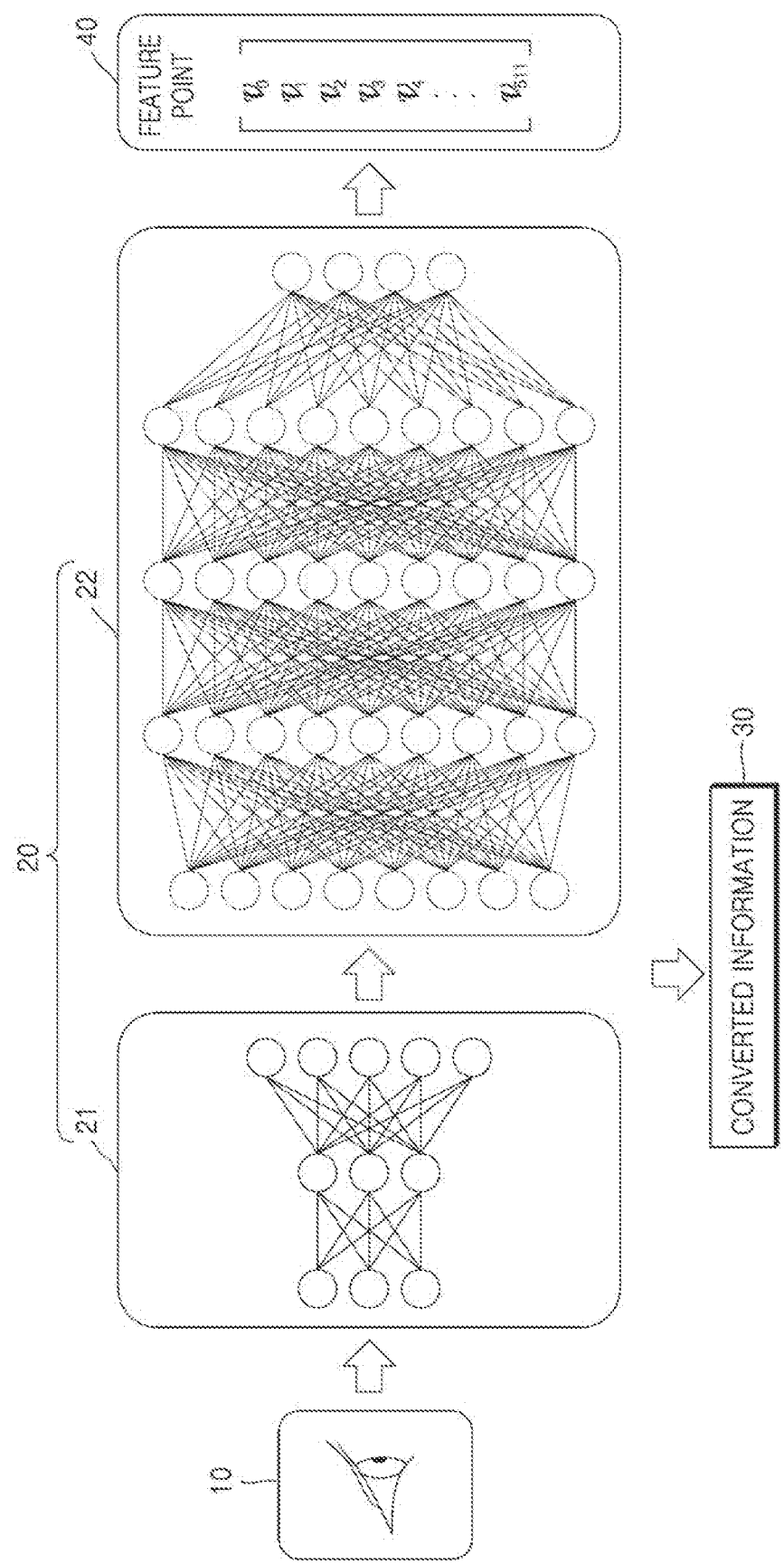
FIG. 2 is an exemplary diagram illustrating a biometric information registration apparatus according to an embodiment.

The biometric information registration method according to the embodiment shown in FIGS. 3 to 5 includes steps that are performed by the biometric information registration apparatus 100 shown in FIGS. 1 and 2 in a time-series manner. Accordingly, the descriptions that are omitted below but are given above in connection with the biometric information registration apparatus 100 shown in FIGS. 1 and 2 may also be applied to the biometric information registration method according to the embodiment shown in FIGS. 3 to 5.

Referring to FIG. 3, the biometric information registration method performed by the biometric information registration apparatus 100 according to the embodiment may be divided into step S31 of registering the biometric information 10 based on the artificial neural network 20, and step S32 of updating the artificial neural network 20 and renewing the registered information.

The two steps described above will be described in greater detail below with reference to FIGS. 4 and 5.

First, according to FIG. 4, the biometric information registration apparatus 100 may receive the biometric information 10 to register the biometric information 10 of a person for whom registration is requested at step S41. In this case, the biometric information 10 may include a fingerprint image, an iris image, a facial image, and the like, and may include a voice print according to an embodiment, as described above.

In addition, the biometric information registration apparatus 100 may form the artificial neural network 20 in which the encoding network 21 and the feature point extraction network 22 are successively connected to each other in order to register the biometric information 10 at step S42.

Furthermore, the biometric information registration apparatus 100 may apply the biometric information 10 to the artificial neural network 20 as an input, and may store the output of the encoding network 21 as the converted information 30 at step S43.

In addition, the biometric information registration apparatus 100 may store the output of the feature point extraction network 22 as the biometric information template 40 at step S44.

As described above, the encoding network 21 encodes the biometric information 10 and outputs the converted information 30. According to an embodiment, the converted information 30 may be used to renew the biometric information template 40 when the artificial neural network 20 is updated.

In connection with this, referring to FIG. 5, the process of renewing the biometric information template 40 in response to the update of the artificial neural network 20 performed by the biometric information registration apparatus 100 will be described.

According to an embodiment, the biometric information registration apparatus 100 may update the artificial neural network 20, in which case the biometric information registration apparatus 100 may update the feature point extraction network 22 at step S51. In this case, the biometric information registration apparatus 100 may update the feature point extraction network 22 excluding the encoding network 21.

Furthermore, the biometric information registration apparatus 100 may renew the biometric information template 40 by applying the stored converted information 30 to the updated feature point extraction network 22 as an input at step S52.

Accordingly, the biometric information registration device 100 may obtain the renewed biometric information template 40 from the artificial neural network 20 updated only with the converted information 30, instead of updating the biometric information template 40 by applying the biometric information 10 to the artificial neural network 20.

Therefore, the biometric information registration apparatus 100 may protect personal information by destroying the biometric information 10 without storing it, and may perform immediate and easy maintenance and supplementation even while omitting the cumbersome process of re-receiving the biometric information 10 whenever the artificial neural network 20 is updated.

The term 'unit' used in the above-described embodiments means software or a hardware component such as a field-programmable gate array (FPGA) or application-specific integrated circuit (ASIC), and a 'unit' performs a specific role. However, a 'unit' is not limited to software or hardware. A 'unit' may be configured to be present in an addressable storage medium, and also may be configured to run one or more processors. Accordingly, as an example, a 'unit' includes components, such as software components, object-oriented software components, class components and task components, processes, functions, attributes, procedures, subroutines, segments in program code, drivers, firmware, microcode, circuits, data, a database, data structures, tables, arrays, and variables.

Each of the functions provided in components and 'unit(s)' may be coupled to a smaller number of components and 'unit(s)' or divided into a larger number of components and 'unit(s).'

In addition, components and 'unit(s)' may be implemented to run one or more CPUs in a device or secure multimedia card.

The biometric information registration method according to the embodiment described with reference to FIGS. 3 to 5 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the biometric information registration method according to the embodiment described with reference to FIGS. 3 to 5 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the biometric information registration method according to the embodiment described with reference to FIGS. 3 to 5 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued via the present specification should be defined by the attached claims, rather than the detailed description. All modifications and variations which can be derived from the meanings, scopes and equivalents of the claims should be construed as falling within the scope of the present invention.

The invention claimed is:

1. A biometric information registration apparatus for generating a biometric information template corresponding to biometric information based on an artificial neural network, the biometric information registration apparatus comprising:
an input/output circuitry configured to receive biometric information and output a result of registration of the biometric information;

a memory configured to store a program for registering the biometric information; and a control unit including at least one processor;

wherein the control unit, when receiving a request for registration of the biometric information, forms an artificial neural network in which an encoding network and a feature point extraction network are successively connected to each other by executing the program, applies the biometric information to the artificial neural network as an input, stores an output of the encoding network as converted information and stores an output of the feature point extraction network as a biometric information template;

wherein the converted information is implemented as a multi-dimensional vector value according to a last layer of the encoding network, and is used to renew the biometric information template when the artificial neural network is updated, and wherein the control unit updates the feature point extraction network, and renews the biometric information template by applying the stored converted information to the updated feature point extraction network as an input.

2. The biometric information registration apparatus of claim 1, wherein the control unit destroys the biometric information.

3. A biometric information registration method that is performed by at least one processor for generating a biometric information template corresponding to biometric information based on an artificial neural network, the biometric information registration method comprising:

receiving biometric information;

forming an artificial neural network in which an encoding network and a feature point extraction network are successively connected to each other;

applying the biometric information to the artificial neural network as an input, and storing an output of the encoding network as converted information; and storing an output of the feature point extraction network as a biometric information template;

wherein the converted information is implemented as a multi-dimensional vector value according to a last layer of the encoding network, and is used to renew the biometric information template when the artificial neural network is updated, and wherein the biometric information registration method further comprises:

updating the feature point extraction network; and renewing the biometric information template by applying the stored converted information to the updated feature point extraction network as an input.

4. The biometric information registration method of claim 3, further comprising destroying the biometric information.

5. A non-transitory computer-readable storage medium having stored thereon a program for performing the method set forth in claim 3.

* * * * *